United States Patent
Nishida (10) Patent No.: US 11,604,377 B2
(45) Date of Patent: Mar. 14, 2023

(54) ELECTRO-OPTICAL DEVICE AND ELECTRONIC APPARATUS

(71) Applicant: SEIKO EPSON CORPORATION, Tokyo (JP)

(72) Inventor: Masakazu Nishida, Chino (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 17/486,930

(22) Filed: Sep. 28, 2021

(65) Prior Publication Data

US 2022/0100025 A1 Mar. 31, 2022

(30) Foreign Application Priority Data

Sep. 29, 2020 (JP) .............................. JP2020-163398

(51) Int. Cl.
G02F 1/1333 (2006.01)
G02F 1/1339 (2006.01)
G02F 1/1343 (2006.01)

(52) U.S. Cl.
CPC .... *G02F 1/133388* (2021.01); *G02F 1/13394* (2013.01); *G02F 1/134309* (2013.01)

(58) Field of Classification Search
CPC ........... G02F 1/133388; G02F 1/13394; G02F 1/134309; G02F 2201/501; G02F 1/133337; G02F 1/1339; G02F 1/0107; G02F 2001/13396; G02F 1/13396
See application file for complete search history.

(56) References Cited

U.S. PATENT DOCUMENTS

| 6,870,592 B1 | 3/2005 | Yamamoto et al. |
| 8,134,678 B2 | 3/2012 | Kim et al. |
| 10,054,823 B2 | 8/2018 | Fukuoka et al. |
| 2007/0103634 A1* | 5/2007 | Kim ...................... G02F 1/1339 349/154 |
| 2014/0160413 A1* | 6/2014 | Nishida ............. G02F 1/134309 349/123 |
| 2017/0025082 A1* | 1/2017 | Kobayashi ............ G02F 1/1339 |
| 2017/0176788 A1* | 6/2017 | Fukuoka ............... G02F 1/1339 |

FOREIGN PATENT DOCUMENTS

| JP | 2001005006 | 1/2001 |
| JP | 2007133392 | 5/2007 |
| JP | 2008292861 | 12/2008 |
| JP | 2017111290 | 6/2017 |

* cited by examiner

*Primary Examiner* — Mariam Qureshi
(74) *Attorney, Agent, or Firm* — JCIPRNET (57) ABSTRACT

An electro-optical device includes a display region and a peripheral region located around the display region, the electro-optical device including a first substrate, a second substrate, an electro-optical layer disposed between the first substrate and the second substrate, the electro-optical layer having an optical property that varies in accordance with an electric field, a spacer disposed in the peripheral region and having an insulating property, the spacer being configured to define a distance between the first substrate and the second substrate, and a peripheral electrode disposed in the peripheral region, the peripheral electrode being configured to trap an ionic impurity present in the electro-optical layer, wherein the spacer and the peripheral electrode do not overlap with each other in plan view.

5 Claims, 8 Drawing Sheets

ELECTRO-OPTICAL DEVICE AND ELECTRONIC APPARATUS

The present application is based on, and claims priority from JP Application Serial Number 2020-163398, filed Sep. 29, 2020, the disclosure of which is hereby incorporated by reference herein in its entirety.

BACKGROUND

1. Technical Field

The present disclosure relates to an electro-optical device and an electronic apparatus.

2. Related Art

An electro-optical device such as a liquid crystal display device capable of changing an optical property for each pixel is used for an electronic apparatus such as a projector, for example.

A liquid crystal display device described in JP-A-2008-292861 includes a first substrate, a second substrate, and a liquid crystal layer disposed between the first substrate and the second substrate. In addition, the liquid crystal device includes a pixel electrode formed in a display region and a peripheral electrode formed around the pixel electrode. The peripheral electrode is provided for moving ionic impurities present in the display region to the peripheral region. By moving the ionic impurities in the liquid crystal layer, display irregularity is suppressed.

To define a distance between the first substrate and the second substrate, it is also known to dispose a columnar spacer with insulating properties therebetween. The liquid crystal display panel described in JP-A-2001-5006 includes a spacer disposed in a pixel region. The spacer is formed at the pixel electrode.

In a case where the spacer described in JP-A-2001-5006 is disposed in the peripheral region described in JP-A-2008-292861, there is a risk that the desired electric field is not formed at the location where the spacer is disposed depending on the arrangement of the spacer. As a result, a function of trapping the ionic impurities by the peripheral electrode is reduced, and display quality is reduced due to the display irregularity, etc.

SUMMARY

An aspect of the electro-optical device according to the present disclosure is an electro-optical device including a display region and a peripheral region located around the display region, the electro-optical device including a first substrate, a second substrate, an electro-optical layer disposed between the first substrate and the second substrate, the electro-optical layer having an optical property that varies in accordance with an electric field, a spacer disposed in the peripheral region and having an insulating property, the spacer being configured to define a distance between the first substrate and the second substrate, and a peripheral electrode disposed in the peripheral region, the peripheral electrode being configured to trap an ionic impurity present in the electro-optical layer, wherein the spacer and the peripheral electrode do not overlap with each other in plan view.

An aspect of an electronic apparatus includes the electro-optical device described above, and a control unit configured to control operation of the electro-optical device.

DESCRIPTION OF EXEMPLARY EMBODIMENTS

Preferred embodiments of the present disclosure will be described below with reference to the accompanying drawings. Note that, in the drawings, dimensions and scales of sections are differed from actual dimensions and scales as appropriate, and some of the sections are schematically illustrated to make them easily recognizable. Further, the scope of the present disclosure is not limited to these embodiments unless otherwise stated to limit the present disclosure in the following descriptions.

1. Electro-Optical Apparatus

1A. First Exemplary Embodiment

1Aa. Basic Configuration

Figure 1:
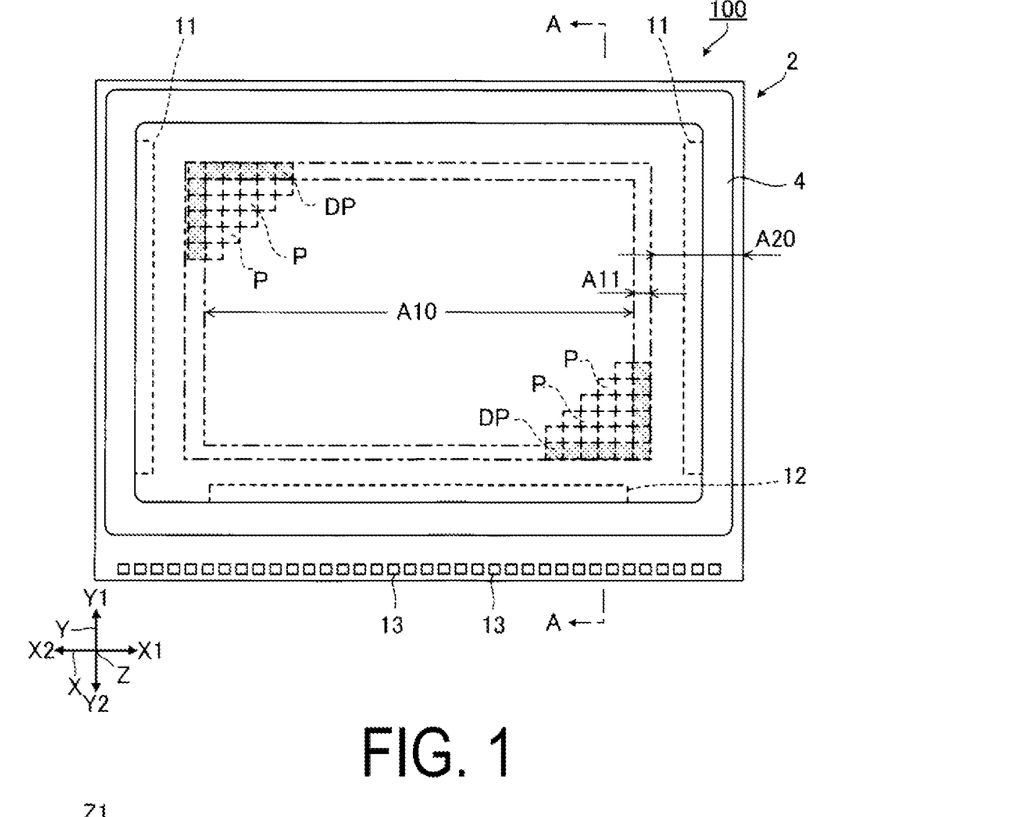
FIG. 1 is a plan view of an electro-optical device according to a first exemplary embodiment.
Figure 2:
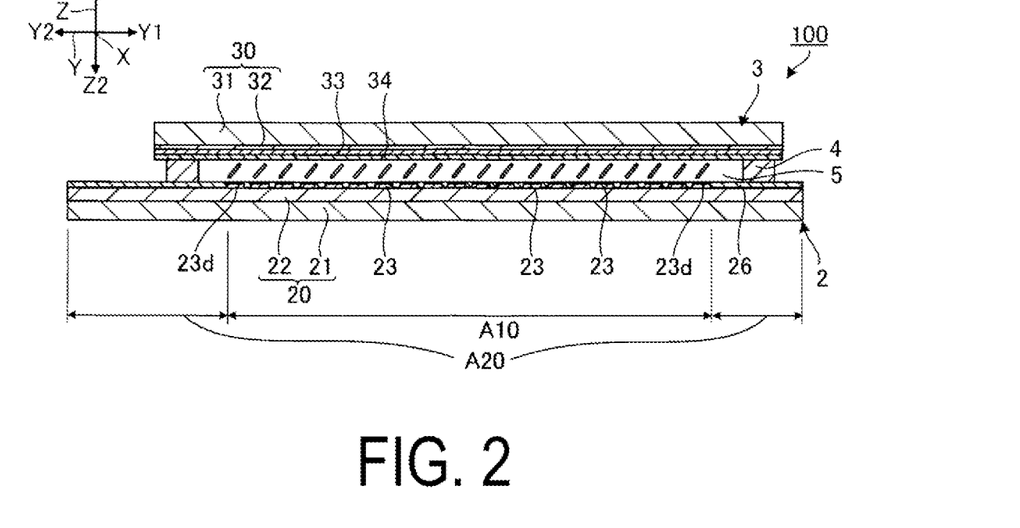
FIG. 2 is a cross-sectional view taken along a line A-A of the electro-optical device illustrated in FIG. 1.

FIG. 1 is a plan view of an electro-optical device 100 according to a first exemplary embodiment. FIG. 2 is a cross-sectional view taken along a line A-A of the electro-optical device 100 illustrated in FIG. 1. Note that in FIG. 1, an illustration of a counter substrate 3 is omitted. Note that, for convenience of explanation, the description will be made appropriately using an X-axis, a Y-axis, and a Z-axis orthogonal to each other. In addition, one direction along the X-axis is designated as an X1 direction, and the direction opposite the X1 direction is designated as an X2 direction. Similarly, one direction along the Y-axis is designated as a Y1 direction, and the direction opposite the Y1 direction is designated as a Y2 direction. The direction along the Z-axis is designated a Z1 direction, and the direction opposite the Z1 direction is designated as a Z2 direction. Additionally, in the following, viewing in the Z1 direction or the Z2 direction is referred to as "plan view", and viewing from a direction perpendicular to a cross section including the Z-axis is referred to as "cross-sectional view". Additionally, the Z1 direction or the Z2 direction is a direction in which the first substrate 20 and the second substrate 30 described below overlap with each other.

The electro-optical device 100 illustrated in FIGS. 1 and 2 is a transmissive liquid crystal device in an active matrix driving method. As illustrated in FIG. 2, the electro-optical device 100 includes an element substrate 2 having translucency, an counter substrate 3 having translucency, a sealing member 4 having a frame shape, and a liquid crystal layer 5. In the following description, the "translucency" refers to transparency to visible light, and means that a transmittance of visible light is greater than or equal to 50%. The element substrate 2, the liquid crystal layer 5, and the counter substrate 3 are arranged in this order in the Z1 direction. Also, although not illustrated in FIGS. 1 and 2, the electro-optical device 100 includes a plurality of first spacers 61 and a plurality of second spacers 62 that define the thickness of the liquid crystal layer 5. In addition, a shape of the electro-optical device 100 illustrated in FIG. 1 in plan view is square, but may be, for example, circular.

The element substrate 2 illustrated in FIG. 2 is a substrate having a plurality of TFTs (Thin Film Transistors) described below. The element substrate 2 includes a first substrate 20, a plurality of pixel electrodes 23, a plurality of dummy pixel electrodes 23d, and a first oriented film 26. Note that the dummy pixel electrodes 23d may be omitted. The first substrate 20 includes a first base body 21 and an insulating layer 22. The first base body 21, the insulating layer 22, the plurality of pixel electrodes 23, and the first oriented film 26 are arranged in this order toward the liquid crystal layer 5. The plurality of dummy pixel electrodes 23d are disposed on the same plane as the plurality of pixel electrodes 23, and surround the plurality of pixel electrodes 23 in plan view. Although not illustrated in FIGS. 1 and 2, the element substrate 2 includes a peripheral electrode 25 for trapping ionic impurities. The peripheral electrode 25 is described in more detail below.

The first base body 21 is constituted by a plate having translucency and insulating properties. The material of the first base body 21 is, for example, glass or quartz. The insulating layer 22 is a stack body of a plurality of insulating films having translucency and insulating properties. The material of each insulating film is, for example, an inorganic material containing silicon such as silicon oxide and silicon oxynitride. A plurality of transistors 24 and various wiring described below are disposed at the insulating layer 22. Moreover, each of the pixel electrodes 23 and the dummy pixel electrodes 23d has translucency. Each material of the pixel electrodes 23 and the dummy pixel electrodes 23d is a transparent conductive material such as ITO (Indium Tin Oxide) or IZO (Indium Zinc Oxide). The pixel electrodes 23 are electrodes that contribute to display. The dummy pixel electrodes 23d are electrodes that have the same configuration as the pixel electrodes 23, but does not contribute to display. The plurality of dummy pixel electrodes 23d are located outside the plurality of pixel electrodes 23 in plan view, and surround the plurality of pixel electrodes 23. In addition, the first oriented film 26 has translucency and is located closest to the liquid crystal layer 5 side in the element substrate 2. The first oriented film 26 orients the liquid crystal molecules of the liquid crystal layer 5. Furthermore, the first oriented film 26 is an oblique vapor deposition film formed by oblique deposition. The material of the first oriented film 26 is, for example, silicon oxide.

The counter substrate 3 is a substrate disposed facing the element substrate 2. The counter substrate 3 includes the second substrate 30, a common electrode 33, and a second oriented film 34. The second substrate 30 includes a second base body 31 and an insulating film 32. The second base body 31, the insulating film 32, the common electrode 33, and the second oriented film 34 are arranged in this order toward the liquid crystal layer 5. Each of the insulating film 32, the common electrode 33, and the second oriented film 34 overlaps substantially with all regions of the second base body 31 in plan view.

The second base body 31 is constituted by a plate having translucency and insulating properties. The material of the second base body 31 is, for example, glass or quartz. The material of the insulating film 32 is, for example, a silicon-based inorganic material having translucency and insulating properties such as silicon oxide. A frame-shaped parting portion is disposed at the insulating film 32, although not illustrated. The "light shielding" refers to a light shielding property to visible light, and preferably means that a transmittance of visible light is less than 50% and more preferably 10% or less. Furthermore, the common electrode 33 is a counter electrode disposed at the plurality of pixel electrodes 23 via the liquid crystal layer 5. The common electrode 33 is disposed between the second substrate 30 and the liquid crystal layer 5. The common electrode 33 is electrically coupled to the element substrate 2 via a conduction electrode (not illustrated). A fixed potential is applied to the common electrode 33, for example. The material of the common electrode 33 is a transparent conductive material such as ITO or IZO, for example. In addition, the second oriented film 34 has translucency and is located closest to the liquid crystal layer 5 side in the counter substrate 3. The second oriented film 34 orients the liquid crystal molecules of the liquid crystal layer 5. The second oriented film 34 is an oblique vapor deposition film formed by oblique deposition. The material of the second oriented film 34 is, for example, silicon oxide.

The sealing member 4 is disposed between the element substrate 2 and the counter substrate 3. The sealing member 4 is formed using an adhesive containing various types of curable resins such as epoxy resin, for example. The sealing member 4 may or may not include a gap material made from an inorganic material such as glass. Although it is also possible for the gap material to control a distance between the first substrate 20 and the second substrate 30, the plurality of first spacers 61, the plurality of second spacers 62, and the distance between the first substrate 20 and the second substrate 30 can be accurately controlled in a wide range.

The liquid crystal layer 5 is disposed in a region surrounded by the element substrate 2, the counter substrate 3, and the sealing member 4. The liquid crystal layer 5 is disposed between the first substrate 20 and the second substrate 30, and is an electro-optical layer having a optical property that varies in accordance with the electric field generated between the pixel electrodes 23 and the common electrode 33. The liquid crystal layer 5 contains liquid crystal molecules having positive or negative dielectric anisotropy. The orientation of the liquid crystal molecules varies in accordance with the voltage applied to the liquid crystal layer 5.

As illustrated in FIG. 1, a plurality of scanning line drive circuits 11, a signal line driving circuit 12, and a plurality of external terminals 13 are disposed at the element substrate 2. A portion of the plurality of external terminals 13, although not illustrated, is coupled to wiring drawn from the scanning line drive circuits 11 or the signal line driving circuit 12. Furthermore, the plurality of external terminals 13 include terminals to which a common potential is applied. The terminals are electrically coupled to the common electrode 33 of the counter substrate 3 via wiring and a conductive material (not illustrated).

The electro-optical device 100 includes the display region A10 that displays an image, and a peripheral region A20 located around the display region A10 in plan view, and a dummy pixel region A11. The display region A10 includes a plurality of pixels P disposed in a matrix pattern. The plurality of pixel electrodes 23 are disposed in a one-to-one manner with respect to the plurality of pixels P. Note that the common electrode 33 described above is provided in common with the plurality of pixels P. Furthermore, the scanning line drive circuits 11 and the signal line driving circuit 12 are disposed in the peripheral region A20. As described below, the peripheral electrode 25 for trapping ionic impurities is disposed in the peripheral region A20. The dummy pixel region A11 is located between the display region A10 and the peripheral region A20. A plurality of dummy pixels PD surrounding the plurality of pixels P are provided in the dummy pixel region A11. The plurality of dummy pixel electrodes 23$d$ are disposed in the dummy pixel region A11.

In the present exemplary embodiment, the electro-optical device 100 is transmissive. In the present exemplary embodiment, the image is displayed by modulating the light incident on the counter substrate 3 while the light is emitted from the element substrate 2. Note that the image may be displayed by modulating the light incident on the element substrate 2 while the light is emitted from the counter substrate 3. The electro-optical device 100 may also be reflective. In this case, for example, the common electrode 33 has translucency, and the pixel electrodes 23 are reflective. In the case of being reflective, the light incident on the counter substrate 3 is reflected by the pixel electrodes 23 and is again modulated while being emitted from the counter substrate 3, thereby the image is displayed. In the case of being reflective, the element substrate 2 may not have translucency, and may be, for example, a silicon substrate at which elements, etc. can be created.

Furthermore, the electro-optical device 100 is applied to a display device that performs color display, such as a personal computer and a smartphone described below. When applied to the display device, a color filter is appropriately used for the electro-optical device 100. The electro-optical device 100 is applied to a projection-type projector described below, for example. In this case, the electro-optical device 100 functions as a light valve. Note that in this case, the color filter is omitted from the electro-optical device 100.

1Ab. Electrical Configuration of Element Substrate 2

Figure 3:
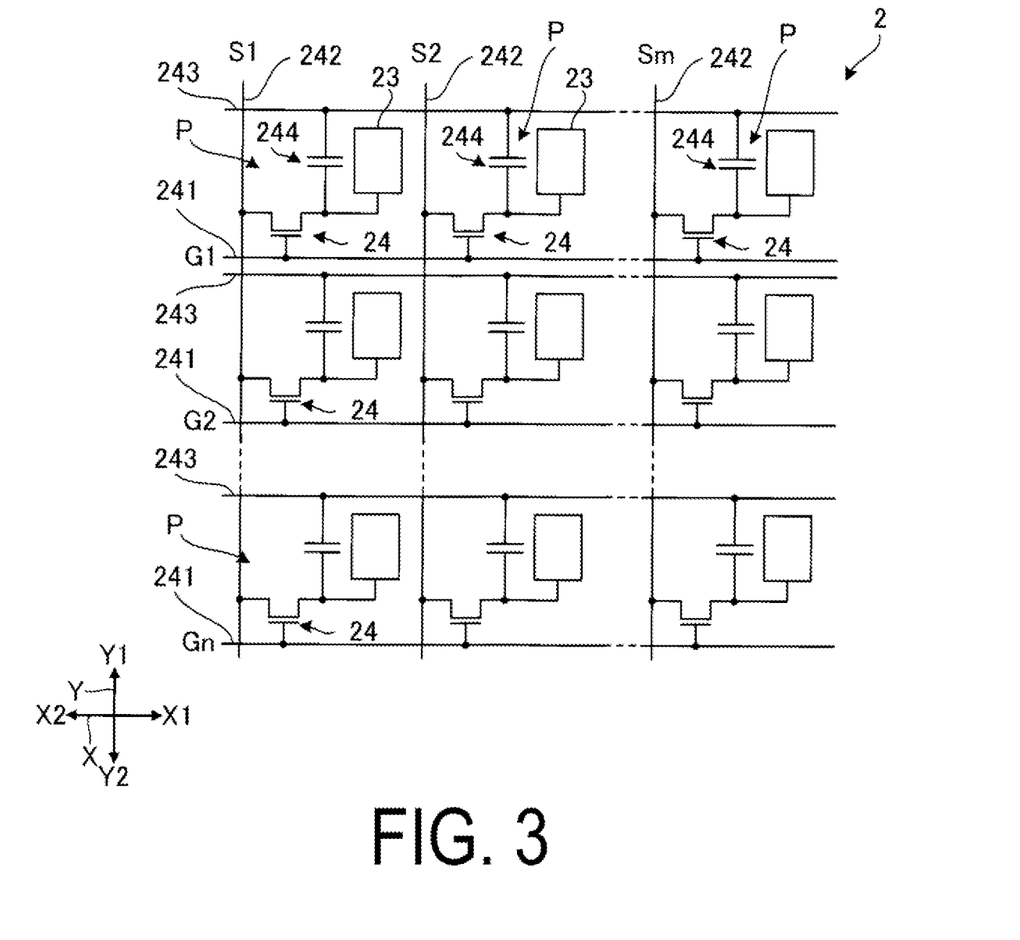
FIG. 3 is an equivalent circuit diagram illustrating an electrical configuration of an element substrate of FIG. 1.

FIG. 3 is an equivalent circuit diagram illustrating an electrical configuration of an element substrate 2 of FIG. 1. As illustrated in FIG. 3, the element substrate 2 includes a plurality of transistors 24, n scanning lines 241, m signal lines 242, and n capacitor lines 243. Note that n and m are integers of 2 or greater, respectively. The transistors 24 are disposed corresponding to each intersection between the n scanning lines 241 and the m signal lines 242. Each transistor 24 is a TFT that functions as a switching element, for example. Each transistor 24 includes a gate, a source, and a drain.

Each of the n scanning lines 241 extends in the X1 direction, and the n scanning lines 241 are arranged at equal intervals in the Y2 direction. The n scanning lines 241 are each electrically coupled to the gates of the corresponding plurality of transistors 24. The n scanning lines 241 are electrically coupled to the scanning line driving circuits 11 shown in FIG. 1 Scanning signals G1, G2, ..., Gn are line-sequentially supplied to the 1 to n scanning lines 241 from the scanning line driving circuits 11.

Each of the m signal lines 242 illustrated in FIG. 3 extends in the Y2 direction, and the m signal lines 242 are arranged at equal intervals in the X1 direction. The m signal lines 242 are each electrically coupled to the sources of the corresponding plurality of transistors 24. The m signal lines 242 are electrically coupled to the signal line driving circuit 12 shown in FIG. 1 Image signals S1, S2, ..., Sm are supplied to the 1 to m signal lines 242. from the signal line driving circuit 12 in parallel.

The n scanning lines 241 and the m signal lines 242 shown in FIG. 3 are electrically insulated from each other and are disposed in a grid pattern in plan view. An region surrounded by two adjacent scanning lines 241 and two adjacent signal lines 242 corresponds to the pixel P. Each of the pixel electrodes 23 is electrically coupled to the drain of the corresponding transistor 24.

Each of the n capacitive lines 243 extends in the X1 direction, and the n capacitor lines 243 are arranged at equal intervals in the Y2 direction. Additionally, the n capacitor lines 243 are electrically insulated with respect to the m signal lines 242 and the n scanning lines 241, and are disposed at intervals with respect to each other. A fixed potential such as a ground potential is applied to each of the capacitor lines 243. The n capacitive lines 243 are each electrically coupled to a corresponding plurality of storage capacitors 244. Each storage capacity 244 is a capacitive element for holding the potential of the pixel electrodes 23. Note that the plurality of storage capacities 244 are electrically coupled to the plurality of pixel electrodes 23 in a one-to-one manner. The plurality of storage capacitors 244 are electrically coupled to the drains of the plurality of transistors 24 in a one-to-one manner.

When the scanning signals G1, G2, Gn are sequentially activated and the n scanning lines 241 are sequentially selected, then the transistors 24 coupled to the selected scanning lines 241 are turned to be on-state. Then, the image signals S1, S2, Sm having a magnitudes corresponding to the gradation to be displayed via the m signal lines 242 are captured in the pixels P corresponding to the selected scanning lines 241, and are applied to the pixel electrodes 23. As a result, voltages corresponding to the gradation to be displayed are applied to liquid crystal capacitors formed between the pixel electrodes 23 and the common electrode 33 in FIG. 2, where the orientation of the liquid crystal molecules varies according to the applied voltages. Note that the applied voltages are held by the storage capacitors 244. Such a variation in the orientation of the liquid crystal molecules causes the light to be modulated, to thus enable gradation display.

1A-3. Peripheral Electrode 25

Figure 4:
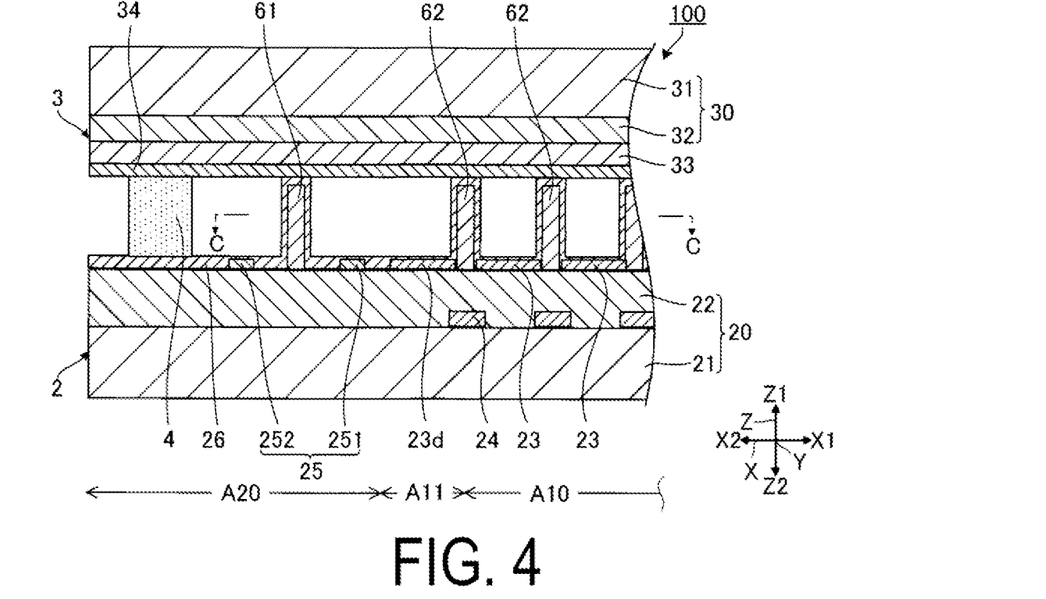
FIG. 4 is an enlarged plan view of a portion of the electro-optical device illustrated in FIG. 1.

FIG. 4 is an enlarged plan view of a portion of the electro-optical device 100 illustrated in FIG. 1. As described above, the element substrate 2 has the peripheral electrode 25. The peripheral electrode 25 illustrated in FIG. 4 is located outside the plurality of pixel electrodes 23 and is separated from the plurality of pixel electrodes 23. In the present exemplary embodiment, the peripheral electrode 25 is located outside the dummy pixel electrodes 23$d$. Additionally, the peripheral electrode 25 is located inside the sealing member 4. The peripheral electrode 25 functions as an ion trap portion for trapping ionic impurities in the liquid crystal layer 5. Note that while the first spacer 61 and the second spacers 62 are illustrated in FIG. 4, which will be described later.

When strong light is incident on the liquid crystal layer 5, photochemical reactions are promoted, and ionic impurities are generated. For example, by UV degradation of the liquid crystal layer 5, ionic impurities such as fluorine, etc. that are separated from the liquid crystal material diffuse into the liquid crystal layer 5. When the ionic impurities aggregate in the display region A10, for example, localization of the agglomerate may cause stains in the display of the electro-optical device 100. As a result, deterioration of the display quality of the electro-optical device 100 is caused. Therefore, the presence of an ionic material in the display region A10 is not preferable because it leads to deterioration of the display quality.

The ionic impurities generated in the display region A10 move to the peripheral region A20 by the thermal diffusion due to, for example, the temperature difference of the liquid crystal layer 5. This temperature difference occurs, for example, by driving the electro-optical device 100. In addition, the peripheral electrode 25 for trapping is disposed in the peripheral region A20, so that the ionic impurities can be trapped in the peripheral region A20 by an electric field generated in the peripheral electrode 25. As a result, the ionic material is prevented from remaining in the display region A10.

The peripheral electrode 25 includes a first electrode 251 and a second electrode 252. The first electrode 251 and the second electrode 252 are separated from each other. The second electrode 252 is spaced apart from the first electrode 251. A potential different from a potential of the first electrode 251 is supplied to the second electrode 252. The ionic impurities are trapped by the electric field generated between the first electrode 251 and the second electrode 252.

The material of the peripheral electrode 25 is a transparent conductive material such as ITO or IZO, for example. In the present exemplary embodiment, the peripheral electrode 25 has translucency, and the material of the peripheral electrode 25 is the same as the material of the pixel electrodes 23. Thus, the peripheral electrode 25 and the pixel electrodes 23 can be easily formed in the same process. In addition, the peripheral electrode 25 is located in the same plane as the pixel electrodes 23 and the dummy pixel electrodes 23d. Accordingly, in the present exemplary embodiment, the position of the peripheral electrode 25 in the Z1 direction is the same as the position of the pixel electrodes 23 in the Z1 direction. Note that the peripheral electrode 25 need not have translucency, and the material of the peripheral electrode 25 may be different from the material of the pixel electrodes 23. The position of the peripheral electrode 25 in the Z1 direction may differ from the position of the pixel electrodes 23 in the Z1 direction.

Figure 5:
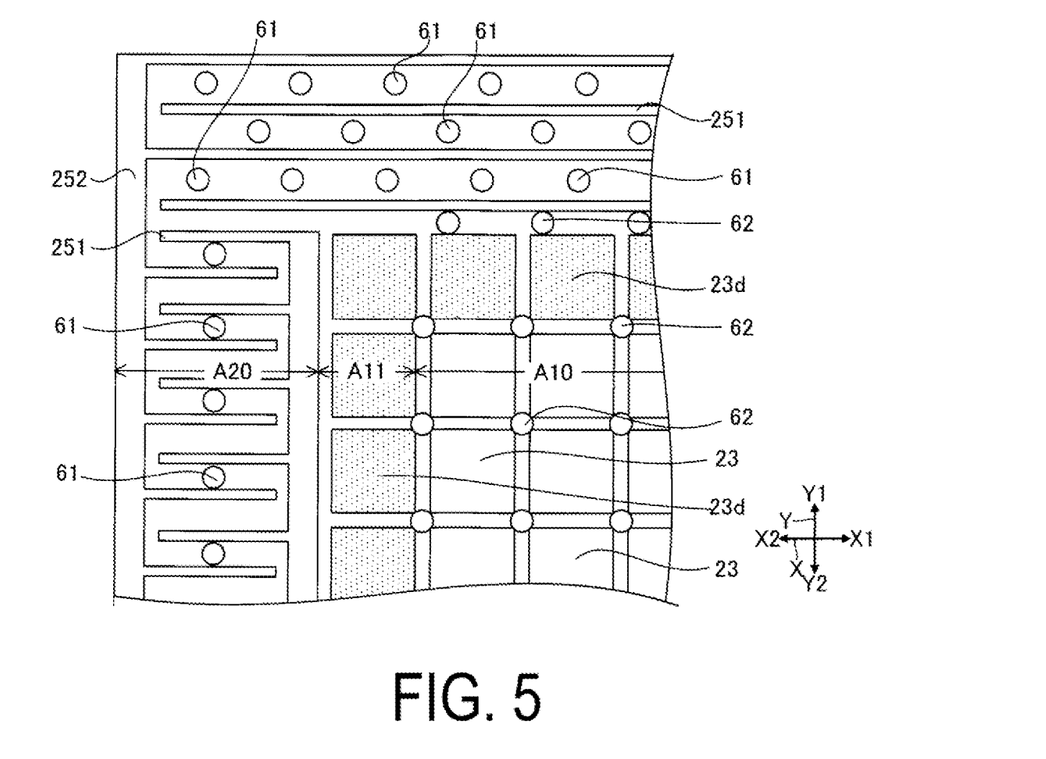
FIG. 5 is a plan view of the electro-optical device illustrated in FIG. 4.

FIG. 5 is a plan view of the electro-optical device 100 illustrated in FIG. 4. Note that, in FIG. 5, for convenience, the dummy pixel electrodes 23d are illustrated as a dot pattern. In FIG. 5, the illustration of the first oriented film 26 is omitted. Further, FIG. 5 is a plan view from the counter substrate 3 toward the element substrate 2, corresponding to a line C-C in FIG. 4.

The peripheral electrode 25 illustrated in FIG. 5 is disposed in a frame shape surrounding the plurality of pixel electrodes 23 in plan view. In FIG. 5, a portion of the peripheral electrode 25 arranged in a frame shape is illustrated. The shape of the first electrode 251 and the second electrode 252 of the peripheral electrode 25 in plan view is a comb shape. Each of the first electrode 251 and the second electrode 252 includes a base portion extending in the Y1 direction and a plurality of tooth portions protruding in the X1 or X2 direction from the base portion. The plurality of tooth portions are spaced apart from each other. The first electrode 251 and the second electrode 252 are disposed so that the tooth potions of the first electrode 251 and the tooth potions of the second electrode 252 are disposed side by side with each other.

1A-4. First Spacer 61 and Second Spacer 62

As shown in FIG. 4, each of the first spacers 61 and the second spacers 62 is disposed between the first substrate 20 and the second substrate 30. In addition, each of the first spacers 61 and the second spacers 62 is disposed within the liquid crystal layer 5. Note that the first spacers 61 are an example of the "spacer".

In the present exemplary embodiment, each of the first spacers 61 and the second spacers 62 is provided at the element substrate 2. Specifically, each of the first spacers 61 and the second spacers 62 is in contact with the insulating layer 22 and the first oriented film 26 therebetween. Each of the first spacers 61 and the second spacers 62 is coupled to the counter substrate 3 via the first oriented film 26. Note that each of the first spacers 61 and the second spacers 62 is covered by the first oriented film 26, but the first oriented film 26 need not be disposed at the upper surface thereof. In this case, the first spacers 61 and the second spacers 62 may be directly coupled to the counter substrate 3. In addition, in order to reduce the orientation of the region where the first oriented film 26 is not disposed, the first oriented film 26 may be formed at the first spacers 61 and the second spacers 62 by multiple vapor deposition.

Each of the first spacers 61 and the second spacers 62 is a columnar member. Each of the first spacers 61 and the second spacers 62 defines a distance between the first substrate 20 and the second substrate 30. In other words, each of the first spacers 61 and the second spacers 62 defines the thickness of the liquid crystal layer 5. By having the first spacers 61 and the second spacers 62, changes in the distance between the first substrate 20 and the second substrate 30 over time can be suppressed compared to the case where the first spacers 61 and the second spacers 62 are not included.

Note that each of the shapes of the first spacers 61 and the second spacers 62 is cylindrical, but the shape may be, for example, a wall shape.

The shapes of the first spacers 61 and the second spacers 62 in each cross-sectional view are quadrangular. Each of the first spacers 61 and the second spacers 62 is cylindrical, and has a surface on the first substrate 20 side corresponding to the bottom surface, a surface on the second substrate 30 side corresponding to the upper surface, and a side surface coupling the two surfaces. In the present exemplary embodiment, the side surface is parallel to the Z1 direction. Each width of the surfaces of the first substrate 20 side and the second substrate 30 side are substantially equal. The width is the length in the X-Y plane.

In addition, the number of each of the first spacers 61 and the second spacers 62 is a plurality but may be one. However, by having the plurality of first spacers 61 and the plurality of second spacers 62, the distance between the first substrate 20 and the second substrate 30 can be made uniform throughout the entire region of the electro-optical device 100.

Additionally, the first spacers 61 and the second spacers 62 have insulating properties and translucency. Note that in the present exemplary embodiment, the first spacers 61 and the second spacers 62 have translucency, but may not have translucency. Examples of the material of the first spacers 61 and the second spacers 62 include an inorganic material including silicon such as silicon oxide and silicon oxynitride, or a resin material. In particular, the material of the first spacers 61 and the second spacers 62 are preferably an inorganic material. This avoids the possibility that the resin component may enter into the liquid crystal layer 5. As a result, problems such as erroneous actuation due to organic contamination can be prevented. Further, since each material of the first spacers 61 and the second spacers 62 is an inorganic material, the dimensional accuracy of the first spacers 61 and the second spacers 62 can be improved compared to a case in which each material is an organic material, and dimensional changes over time can be difficult to occur. Thus, the distance between the element substrate 2 and the counter substrate 3 can be stabilized over a long period of time.

As illustrated in FIG. 5, the shape of the first spacers 61 and the second spacers 62 in plan view is circular, but the shape is not limited to a circular shape. For example, the shape may be a polygon such as a quadrangle, a diamond shape, or a hexagon.

The first spacers 61 are disposed in the peripheral region A20. The second spacers 62 are disposed in the display region A10. Note that in the present exemplary embodiment, the second spacers 62 are also disposed in the dummy pixel region A11. The plurality of first spacers 61 are spaced apart from one another. The plurality of second spacers 62 are spaced apart from one another.

As illustrated in FIG. 5, the first spacers 61 do not overlap with the peripheral electrode 25 in plan view. Thus, the supply of potential to the peripheral electrode 25 due to the first spacers 61 overlapping with the peripheral electrode 25 in plan view can be avoided. As a result, the possibility that no electric field is formed between the first electrode 251 and the second electrode 252 is suppressed. Thus, due to the presence of the insulating first spacers 61, a significant decrease in the function of trapping the ionic impurities by the peripheral electrode 25 is suppressed. Thus, both the function of defining the distance between the first substrate 20 and the second substrate 30 by the first spacers 61 and the function of trapping the ionic impurities by the peripheral electrode 25 can be effectively exerted. As a result, a reduction in the display quality due to the display irregularity, etc. can be suppressed.

Each first spacer 61 is disposed between the first electrode 251 and the second electrode 252. Specifically, each first spacer 61 is located between the tooth potions of the first electrode 251 and the tooth potions of the second electrode 252. The first spacers 61 can be efficiently disposed by effectively utilizing a space between the first electrode 251 and the second electrode 252.

In addition, the plurality of first spacers 61 are disposed in an island shape. Note that the plurality of first spacers 61 may be arranged at equal intervals or may not be arranged at equal intervals.

In addition to the plurality of first spacers 61, the plurality of second spacers 62 are provided. Therefore, the variation in the distance between the first substrate 20 and the second substrate 30 can be suppressed for a long period of time as compared with the case where the second spacers 62 are not provided.

The second spacers 62 are provided for each pixel P pitch. Although not illustrated, the second spacers 62 overlap with the transistors 24 in plan view. Further, each second spacer 62 is located in a region between the plurality of pixel electrodes 23 in plan view. The second spacers 62 do not overlap with the pixel electrodes 23 in plan view. Since the second spacers 62 do not overlap with the pixel electrodes 23 in plan view, a reduction in an opening ratio caused by the presence of the second spacers 62 can be suppressed.

Note that each second spacer 62 may have a portion that overlaps with the pixel electrodes 23. In this case, in order to prevent a decrease in the opening ratio, the proportion of the portion of the second spacers 62 that overlap with the pixel electrodes 23 is preferably smaller than the proportion of the portion of the second spacers 62 that do not overlap with the pixel electrodes 23.

In the present exemplary embodiment, the plurality of the second spacers 62 are disposed in a one-to-one manner with respect to the plurality of pixels P. However, the second spacers 62 need not be disposed for each pixel P pitch. However, by disposing the second spacers 62 for each pixel P, the distance between the first substrate 20 and the second substrate 30 can be suppressed for each pixel pitch P.

In addition, in the present exemplary embodiment, the first spacers 61 and the second spacers 62 are provided at the element substrate 2. Thus, compared to a case where the first spacers 61 and the second spacers 62 are provided at the counter substrate 3, misalignment between the first spacers 61 and the second spacers 62, and the peripheral electrode 25, the pixel electrodes 23 and the dummy pixel electrodes 23d are easily reduced.

According to the electro-optical device 100 described above, both the function of providing the peripheral electrode 25 and the first spacers 61 in the peripheral region to define the distance by the spacer, and the function of trapping the ionic impurities by the peripheral electrode can be effectively exerted, and thus a reduction in the display quality is suppressed.

Note that at least one of the element substrate 2 and the counter substrate 3 described above may include a lens layer having a plurality of lenses. The lens is provided for each of the plurality of pixel electrodes 23. By having such a lens layer, it is possible to improve the efficiency of light utilization, and thus the electro-optical device 100 having excellent brightness and display quality can be realized.

1B. Second Exemplary Embodiment

A second exemplary embodiment will be described. Note that, for the elements having the same functions as those of the first exemplary embodiment in each of the following examples, the reference numerals used in the description of the first exemplary embodiment will be diverted and detailed description of each will be omitted as appropriate.

Figure 6:
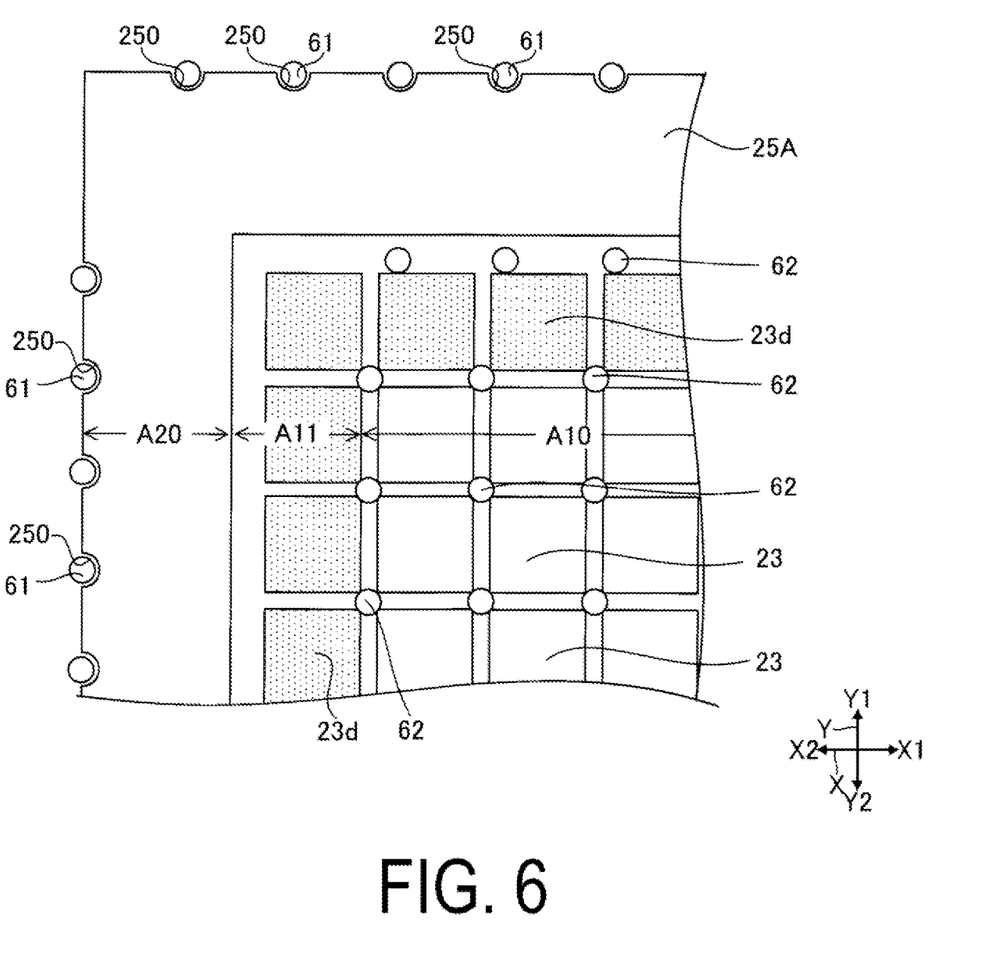
FIG. 6 is an enlarged plan view of a portion of an electro-optical device according to a second exemplary embodiment.

FIG. 6 is an enlarged plan view of a portion of the electro-optical device 100 according to the second exemplary embodiment, corresponding to FIG. 5 of the first exemplary embodiment. In the electro-optical device 100 of the present exemplary embodiment, the peripheral electrode 25A is mainly different from the peripheral electrode 25 of the first exemplary embodiment. Hereinafter, matters different from the peripheral electrode 25 of the first exemplary embodiment will be described with respect to the peripheral electrode 25A, and description of the matters items will be omitted as appropriate.

The shape of the peripheral electrode 25A illustrated in FIG. 6 in plan view is a quadrangular frame shape. The electro-optical device 100 of the present exemplary embodiment traps ionic impurities by an electric field generated between the peripheral electrode 25A and the common electrode 33 disposed opposite to the peripheral electrode 25A. The peripheral electrode 25A does not overlap with the plurality of first spacers 61 in plan view. Thus, the presence of the insulating first spacers 61 avoids blocking the supply of potential to the peripheral electrode 25A. As a result, a significant decrease in the function of trapping the ionic impurities by the peripheral electrode 25A is suppressed. Thus, both the function of defining the distance between the first substrate 20 and the second substrate 30 by the first spacers 61 and the function of trapping the ionic impurities by the peripheral electrode 25A can be effectively exerted. As a result, a reduction in the display quality can be suppressed.

The peripheral electrode 25A of the present exemplary embodiment and the peripheral electrode 25 of the first exemplary embodiment are selected depending on, for example, the type of the ionic impurities to be trapped, etc.

Further, the peripheral electrode 25A includes a plurality of concave portions 250. Each concave portion 250 is recessed toward a direction included in the X-Y plane, which is a direction intersecting the Z1 direction. The plurality of concave portions 250 are disposed one-to-one relative to the plurality of first spacers 61. The first spacers 61 are disposed at the concave portions 250. Therefore, the area of the electro-optical device 100 in plan view is prevented from increasing compared to a case where the concave portions 250 are not provided.

In the illustrated example, the plurality of first spacers 61 are disposed on the outer side of the peripheral electrode 25A. Therefore, as compared with the case where the plurality of first spacers 61 are disposed inside the peripheral electrode 25, changes in the distance between the first substrate 20 and the second substrate 30 over time can be further suppressed. Note that the first spacers 61 may be located inside the peripheral electrode 25.

1C. Third Exemplary Embodiment

A third exemplary embodiment will be described. Note that, for the elements having the same functions as those of the first exemplary embodiment in each of the following examples, the reference numerals used in the description of the first exemplary embodiment will be diverted and detailed description of each will be omitted as appropriate.

Figure 7:
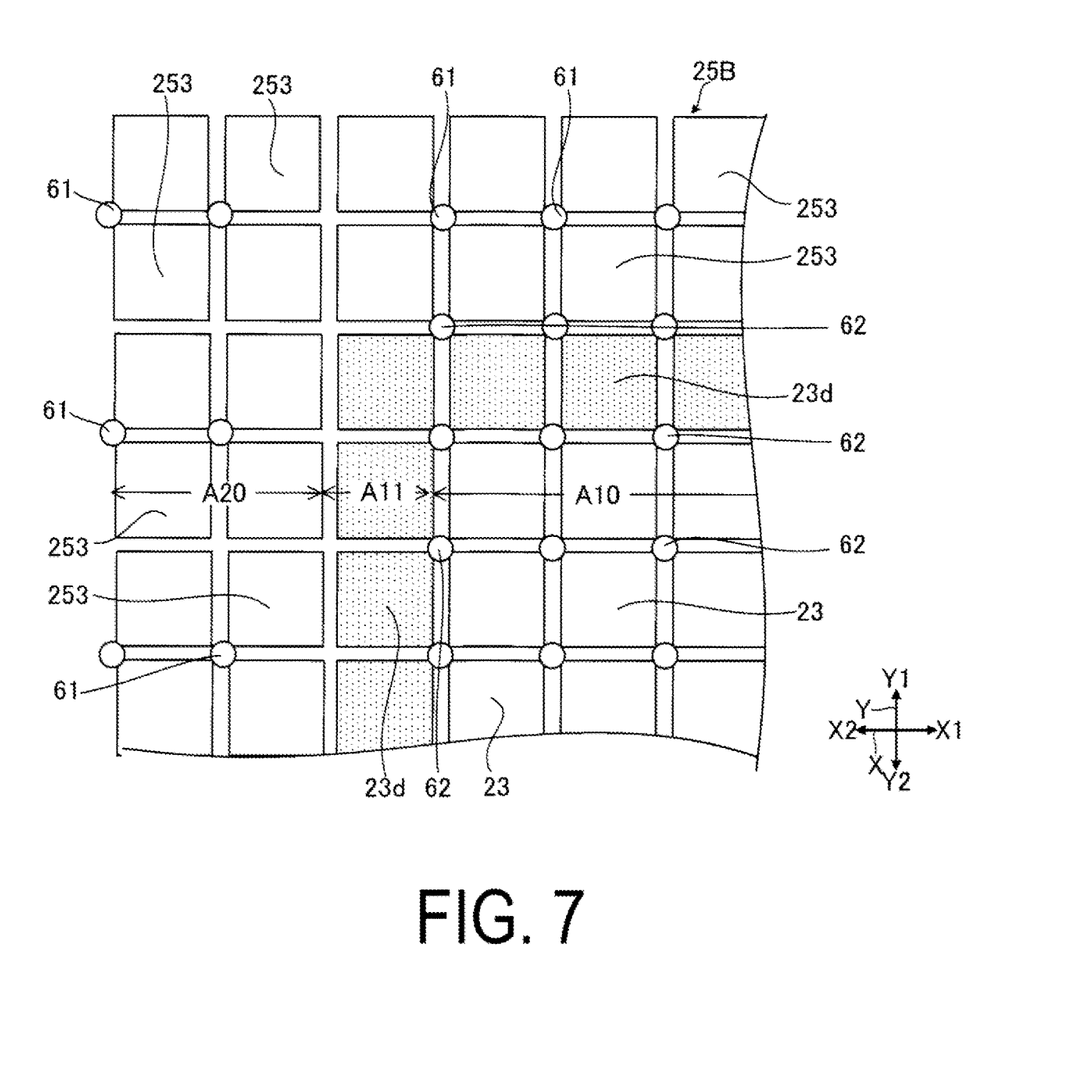
FIG. 7 is an enlarged plan view of a portion of an electro-optical device according to a third exemplary embodiment.

FIG. 7 is an enlarged plan view of a portion of the electro-optical device 100 according to the third exemplary embodiment, corresponding to FIG. 5 of the first exemplary embodiment. In the electro-optical device 100 of the present exemplary embodiment, the peripheral electrode 25B is mainly different from the peripheral electrode 25 of the first exemplary embodiment. Hereinafter, matters different from the peripheral electrode 25 of the first exemplary embodiment will be described with respect to the peripheral electrode 25B, and description of the matters items will be omitted as appropriate.

The peripheral electrode 25B illustrated in FIG. 6 has a plurality of electrodes 253. The plurality of electrodes 253 are disposed in a frame shape surrounding the plurality of pixel electrodes 23 in plan view. The plurality of electrodes 253 are spaced apart from each other. The shape of each electrode 253 in plan view corresponds to a shape of the pixel electrodes 23 in plan view. Specifically, the shape of each electrode 253 in plan view is the same square shape of the pixel electrodes 23 in plan view. In addition, the shape of each electrode 253 in plan view is the same square of the shape of the dummy pixel electrodes 23d as viewed in plan view. The plurality of electrodes 253 are disposed in a matrix pattern with the plurality of pixel electrodes 23 and the plurality of dummy pixel electrodes 23d.

The electro-optical device 100 of the present exemplary embodiment traps ionic impurities by an electric field generated between the peripheral electrode 25B and the common electrode 33. Such a peripheral electrode 25B does not overlap with the plurality of first spacers 61 in plan view. Thus, the presence of the insulating first spacers 61 avoids blocking the supply of potential to the peripheral electrode 25B. As a result, a significant decrease in the function of trapping the ionic impurities by the peripheral electrode 25B is suppressed. Thus, both the function of defining the distance between the first substrate 20 and the second substrate 30 by the first spacers 61 and the function of trapping the ionic impurities by the peripheral electrode 25B can be effectively exerted. As a result, a reduction in the display quality can be suppressed.

The peripheral electrode 25B of the present exemplary embodiment, the peripheral electrode 25A of the second exemplary embodiment, and the peripheral electrode 25 of the first exemplary embodiment are selected depending on, for example, the type of ionic impurities to be trapped, etc.

In addition, the shape of each electrode 253 in plan view corresponds to the shape of the pixel electrodes 23 and the dummy pixel electrodes 23d in plan view, so that the electrodes 253, the pixel electrodes 23, and the dummy pixel electrodes 23d can be easily formed in the same process compared to other exemplary embodiments.

In addition, the shape of each electrode 253 in plan view corresponds to the shape of the pixel electrodes 23 and the dummy pixel electrodes 23d in plan view, so that the electrodes 253, the pixel electrodes 23, and the dummy pixel electrodes 23d are easily disposed in a matrix pattern. As a result, misalignment between the first spacers 61 and the second spacers 62, and the electrodes 253, the pixel electrodes 23 and the dummy pixel electrodes 23d are easily reduced. The first spacers 61 of the present exemplary embodiment, similar to the second spacers 62, are located in a region between the plurality of pixel electrodes 23 in plan view. Since the electrodes 253, the pixel electrodes 23, and the dummy pixel electrodes 23d are easily disposed in a matrix pattern, it is easy to dispose the first spacers 61 so that the first spacers 61 do not overlap with the peripheral electrode 25B in plan view.

2. Modification Example

Each of the embodiments exemplified above can be variously modified. Specific modification aspects applied to each of the embodiments described above are exemplified below. Two or more modes freely selected from exemplifications below can be appropriately used in combination as long as mutual contradiction does not arise. Modification examples on the first exemplary embodiment that follow may be adapted to other exemplary embodiments to the extent that they do not conflict.

In each of the aforementioned exemplary embodiments, the shape of the first spacers 61 and the second spacers 62 when viewed in cross section may be rectangular, but may be trapezoidal. Specifically, each of the first spacers 61 and the second spacers 62 may have a shape in which the width thereof decreases from one of the first substrate 20 or the second substrate 30 toward the other.

Figure 8:
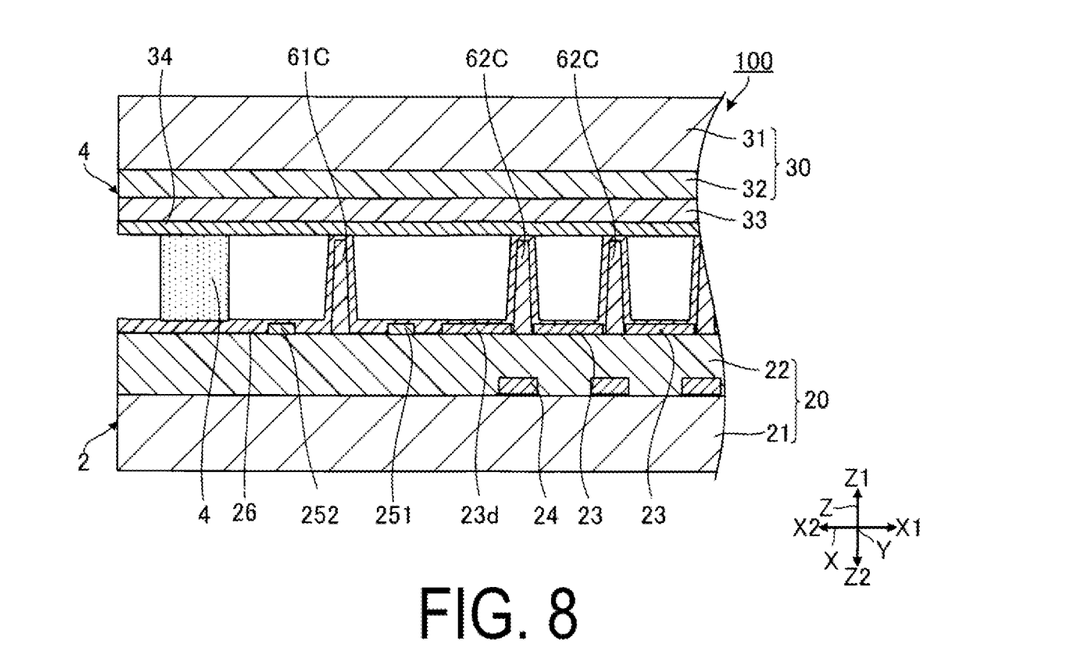
FIG. 8 is a cross-sectional view illustrating a first spacer and a second spacer of a modification example.

FIG. 8 is a cross-sectional view illustrating a first spacer 61C and a second spacer 62C of the modification example. As illustrated in FIG. 8, the shape of the first spacer 61C and the second spacer 62C when viewed in cross-section may be trapezoidal. Specifically, each of the first spacer 61C and the second spacer 62C has a shape in which the width thereof decreases from the first substrate 20 to the second substrate 30. The width of the surface of the first spacer 61C on the first substrate 20 side is greater than the width of the surface of the first spacer 61C on the second substrate 30 side. The width of the surface of the second spacer 62C on the first substrate 20 side is greater than the width of the surface of the second spacer 62C on the second substrate 30 side.

In each of the aforementioned exemplary embodiments, the element substrate 2 includes the first spacers 61 and the second spacers 62, but the counter substrate 3 may include the first spacers 61 and the second spacers 62.

Figure 9:
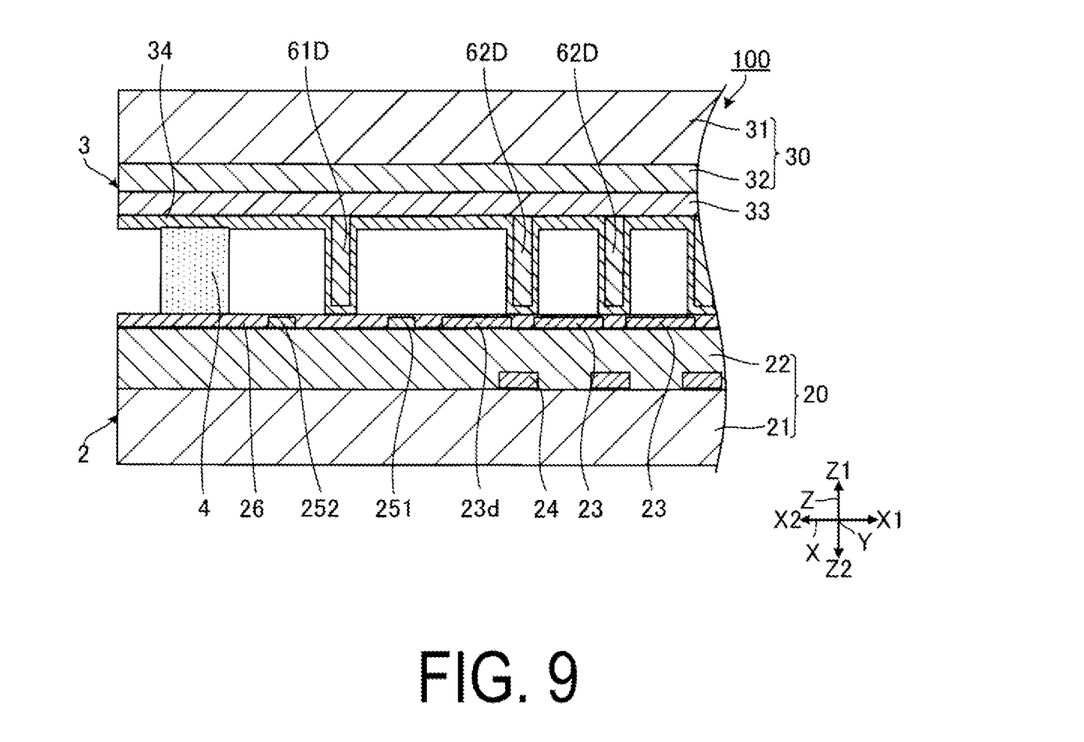
FIG. 9 is a cross-sectional view illustrating a first spacer and a second spacer in another modification example.

FIG. 9 is a cross-sectional view illustrating a first spacer 61D and a second spacer 62D of another modification example. In the example illustrated in FIG. 9, the counter substrate 3 has the first spacer 61D and the second spacer 62D. The first spacer 61D and the second spacer 62D are disposed between and in contact with the common electrode 33 and the second oriented film 34.

In addition, the first spacers 61, 61C, and the second spacers 62, 62C are precisely formed and disposed by patterning the inorganic material or resin material on the element substrate 2 at which the peripheral electrode 25 and the pixel electrodes 23 are formed. The first spacer 61D and the second spacer 62D are formed and disposed by patterning the inorganic material or resin material on the counter substrate 3 at which the common electrode 33 is formed.

In each of the above-described exemplary embodiments, the transistor 24 is a TFT, but may be, for example, a MOSFET (metal-oxide-semiconductor field-effect transistor).

In the embodiments described above, the active matrix type electro-optical device 100 is illustrated, but without being limited thereto, the driving method of the electro-optical device 100 may be a passive matrix method, etc., for example.

The driving method of the "electro-optical device" is not limited to a vertical electric field method, and may be a lateral electric field method. In the first exemplary embodiment, the pixel electrodes 23 are provided at the element substrate 2, and the common electrode 33 is provided at the counter substrate 3. However, an electrode for applying an electric field to the liquid crystal layer 5 may be provided at only one of the element substrate 2 and the counter substrate 3. Examples of the lateral electric field method include an IPS (In Plane Switching) mode. Furthermore, examples of the vertical electric field method include a TN (Twisted Nematic) mode, a VA (Vertical Alignment), a PVA mode, and an OCB (Optically Compensated Bend) mode.

3. Electronic Apparatus

The electro-optical device 100 can be used in various electronic apparatuses.

Figure 10:
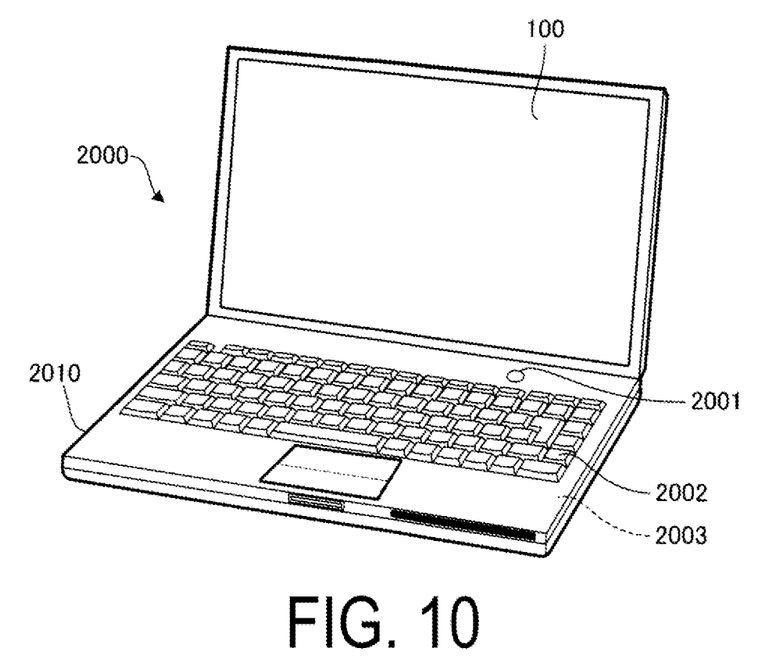
FIG. 10 is a perspective view illustrating a personal computer as an example of the electronic apparatus.

FIG. 10 is a perspective view illustrating a personal computer 2000 as an example of the electronic apparatus. The personal computer 2000 includes the electro-optical device 100 configured to display various images, and a main body portion 2010 at which a power source switch 2001 and a keyboard 2002 are installed, and a control unit 2003. The control unit 2003 includes a processor and a memory, for example, to control the operation of the electro-optical device 100.

Figure 11:
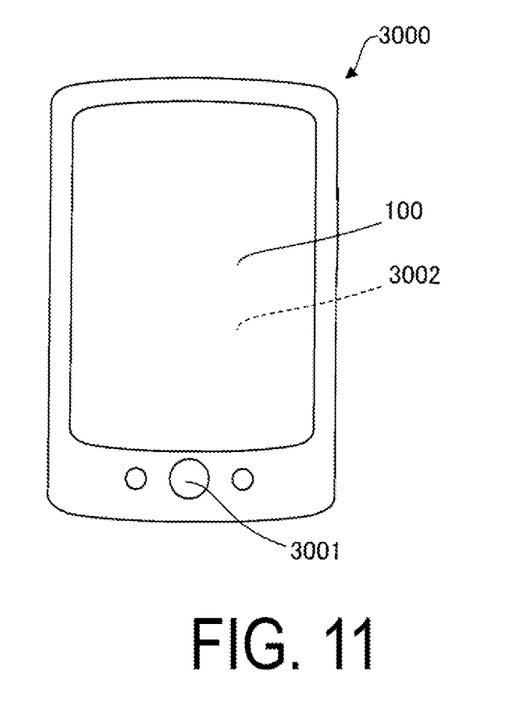
FIG. 11 is a plan view illustrating a smartphone as an example of the electronic apparatus.

FIG. 11 is a plan view illustrating a smartphone 3000 as an example of the electronic apparatus. The smartphone 3000 includes an operating button 3001, the electro-optical device 100 that displays various images, and a control unit 3002. The screen content displayed on the electro-optical device 100 is changed in accordance with the operation of the operation button 3001. The control unit 3002 includes a processor and a memory, for example, to control the operation of the electro-optical device 100.

Figure 12:
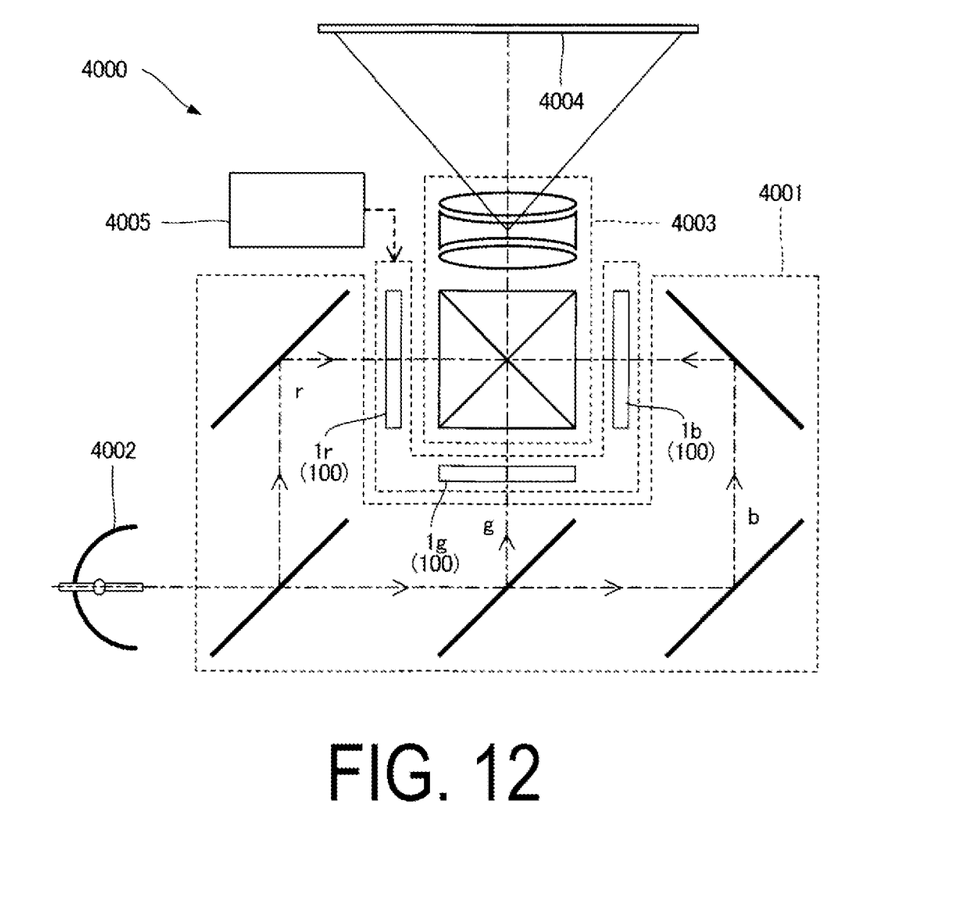
FIG. 12 is a schematic view illustrating a projector which is an example of the electronic apparatus.

FIG. 12 is a schematic view illustrating a projector which is an example of the electronic apparatus. The projection-type display apparatus 4000 is a three-plate type projector, for example. An electro-optical device 1r illustrated is the electro-optical device 100 corresponding to a red display color, an electro-optical device 1g is the electro-optical device 100 corresponding to a green display color, and an electro-optical device 1b is the electro-optical device 100 corresponding to a blue display color. Specifically, the projection-type display apparatus 4000 includes three electro-optical devices 1r, 1g, and 1b that respectively correspond to display colors of red, green, and blue. The control unit 4005 includes a processor and a memory, for example, to control the operation of the electro-optical device 100.

An illumination optical system 4001 supplies a red component r of light emitted from an illumination apparatus 4002 as a light source to the electro-optical device 1r, a green component g of the light to the electro-optical device 1g, and a blue component b of the light to the electro-optical device 1b. Each of the electro-optical devices 1r, 1g, and 1b functions as an optical modulator, such as a light bulb, that modulates respective rays of the monochromatic light supplied from the illumination optical system 4001 depending on display images. A projection optical system 4003 combines the rays of the light emitted from each of the electro-optical devices 1r, 1g, and 1b to project the combined light to a projection surface 4004.

The foregoing electronic apparatus includes the above-described electro-optical device 100 and the control units 2003, 3002, or 4005. According to the electro-optical device 100, a reduction in the display quality due to the display irregularity, etc. can be suppressed. Accordingly, the display quality of the personal computer 2000, the smartphone 3000, or the projection-type display apparatus 4000 can be increased by providing the electro-optical device 100.

Note that the electronic apparatus to which the electro-optical device of the present disclosure is applied is not limited to the exemplified apparatuses, and examples thereof include a PDA (Personal Digital Assistants), a digital still camera, a television, a video camera, a car navigation device, an in-vehicle display, an electronic organizer, an electronic paper, a calculator, a word processor, a workstation, a videophone, and a POS (Point of sale) terminal, etc. Further, examples of the electronic apparatus to which the present disclosure is applied include a printer, a scanner, a copier, a video player, a device provided with a touch panel, etc.

Although the present disclosure has been described above based on the preferred exemplary embodiments, the present disclosure is not limited to the above-described exemplary embodiments. In addition, the configuration of each component of the present disclosure may be replaced with any configuration that exerts the equivalent functions of the above-described embodiments, and to which any configuration may be added.

In the above description, the liquid crystal device is described as an example of the electro-optical device of the present disclosure, but the electro-optical device of the present disclosure is not limited thereto. For example, the electro-optical device of the present disclosure can also be applied to an image sensor, etc. Further, for example, the present disclosure can be applied to a display panel using a light emitting element such as an organic EL (electro luminescence), an inorganic EL, or a light emitting polymer in the same manner as in the above-described exemplary embodiment.

Further, the present disclosure can be applied to an electrophoresis display panel using microcapsules containing a colored liquid and white particles dispersed in the liquid in the same manner as in the above-described exemplary embodiment.

What is claimed is:

1. An electro-optical device including a display region, the electro-optical device comprising:
   a first substrate;
   a second substrate;
   an electro-optical layer disposed between the first substrate and the second substrate;
   a sealing member disposed between the first substrate and the second substrate, the sealing member surrounding the display region in a plan view;
   a spacer disposed between the sealing member and the display region in the plan view and disposed apart from the sealing member via a part of the electro-optical layer in the plan view, the spacer being configured to define a distance between the first substrate and the second substrate; and
   an electrode disposed between the sealing member and the display region in the plan view, the electrode being configured to trap an ionic impurity present in the electro-optical layer, wherein
   the spacer and the electrode do not overlap with each other in the plan view,
   the electrode includes a first electrode and a second electrode spaced apart from the first electrode, the second electrode being supplied with a potential different from a potential of the first electrode, the first electrode and the second electrode being located in a same horizontal plane, and
   the spacer is disposed between the first electrode and the second electrode in the plan view.

2. The electro-optical device according to claim 1, further comprising a counter electrode disposed between the second substrate and the electro-optical layer, wherein
   the electro-optical device is configured to trap the ionic impurity by an electric field generated between the electrode and the counter electrode.

3. The electro-optical device according to claim 1, wherein
   the spacer is a first spacer, and
   the electro-optical device further includes a second spacer disposed in the display region, the second spacer being configured to define a distance between the first substrate and the second substrate.

4. An electronic apparatus comprising:
   the electro-optical device according to claim 1; and
   a control unit configured to control operation of the electro-optical device.

5. The electro-optical device according to claim 1, wherein the spacer has an insulating property.

* * * * *